(12) United States Patent
Ghaderi

(10) Patent No.: US 11,072,245 B2
(45) Date of Patent: Jul. 27, 2021

(54) MOTOR CONTROL METHOD, MOTOR CONTROL SYSTEM, AND ELECTRIC POWER STEERING SYSTEM

(71) Applicant: Nidec Corporation, Kyoto (JP)

(72) Inventor: Ahmad Ghaderi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 347 days.

(21) Appl. No.: 16/324,207

(22) PCT Filed: Aug. 1, 2017

(86) PCT No.: PCT/JP2017/027846
§ 371 (c)(1),
(2) Date: Feb. 8, 2019

(87) PCT Pub. No.: WO2018/030209
PCT Pub. Date: Feb. 15, 2018

(65) Prior Publication Data
US 2019/0176648 A1 Jun. 13, 2019

(30) Foreign Application Priority Data
Aug. 9, 2016 (JP) .............................. JP2016-156691

(51) Int. Cl.
*B62D 1/00* (2006.01)
*B60L 15/20* (2006.01)
(Continued)

(52) U.S. Cl.
CPC .......... *B60L 15/2036* (2013.01); *G06F 17/11* (2013.01); *H02P 6/16* (2013.01);
(Continued)

(58) Field of Classification Search
CPC ............. B60L 15/2036; B60L 2240/24; B60L 2240/423; H02P 21/18; H02P 6/182;
(Continued)

(56) References Cited

U.S. PATENT DOCUMENTS

| 5,357,181 A | 10/1994 | Mutoh et al. |
| 6,794,775 B2 | 9/2004 | Ellerthorpe et al. |

(Continued)

FOREIGN PATENT DOCUMENTS

| JP | 2008-125264 A | 5/2008 |
| JP | 2016-136803 A | 7/2016 |

OTHER PUBLICATIONS

Official Communication issued in International Patent Application No. PCT/JP2017/027846, dated Oct. 24, 2017.
(Continued)

*Primary Examiner* — Shardul D Patel
(74) *Attorney, Agent, or Firm* — Keating & Bennett

(57) ABSTRACT

A motor control method includes acquiring at least one measured torque angle and two estimated torque angles, obtaining all combinations of two torque angles that are combinable with respect to a set of the at least one measured torque angle and the two estimated torque angles and performing an arithmetic operation to determine an error for each combination, selecting a control mode of the motor from control modes including a sensor mode, a sensorless mode, and a shutdown mode, the selecting being performed by referring to a table representing a relationship between the control modes and reference patterns relating to the calculated error group, and controlling the motor in accordance with the selected control mode.

8 Claims, 13 Drawing Sheets

(51) Int. Cl.
  *H02P 21/18*   (2016.01)
  *H02P 6/182*   (2016.01)
  *H02P 21/24*   (2016.01)
  *H02P 21/06*   (2016.01)
  *H02P 6/16*    (2016.01)
  *H02P 25/03*   (2016.01)
  *G06F 17/11*   (2006.01)

(52) U.S. Cl.
  CPC .............. *H02P 6/182* (2013.01); *H02P 21/06* (2013.01); *H02P 21/18* (2016.02); *H02P 21/24* (2016.02); *H02P 25/03* (2016.02); *B60L 2240/24* (2013.01); *B60L 2240/423* (2013.01)

(58) Field of Classification Search
  CPC .. H02P 21/24; H02P 21/06; H02P 6/16; H02P 25/03; G06F 17/11; Y02T 10/72; B62D 1/00
  USPC .......................................................... 701/42
  See application file for complete search history.

(56) References Cited

U.S. PATENT DOCUMENTS

| | | | |
|---|---|---|---|
| 7,002,318 B1 | 2/2006 | Schulz et al. | |
| 7,178,412 B2 | 2/2007 | Nallapa | |
| 8,378,605 B2 | 2/2013 | Wang et al. | |
| 2004/0257028 A1* | 12/2004 | Schulz ................... | H02P 6/181 318/802 |
| 2005/0104552 A1* | 5/2005 | Arai ....................... | H02P 25/024 318/801 |
| 2010/0001671 A1* | 1/2010 | Yamada ................. | H02P 6/08 318/400.14 |
| 2010/0152940 A1* | 6/2010 | Mitsutani ............... | B60K 6/365 701/22 |

OTHER PUBLICATIONS

Basler et al., "Fault-Tolerant Strategies for Electronic Power Steering Systems under Functional Safety Requirements", URL:https://www.researchgate.net/publication/271318741, retrieval date Aug. 9, 2016, 7 pages.

Lawson et al., "Fault Tolerant Control for an Electric Power Steering System", 17th IEEE International Conference on Control Applications Part of 2008 IEEE Multi-conference on Systems and Control, ThA02.3, Sep. 3-5, 2008, pp. 486-491.

Ji et al., "Reliability improvement of electric power steering system based on ISO 26262", 2013 International Conference on Quality, Reliability, Risk, Maintenance, and Safety Engineering, Jul. 15-18, 2013, 6 pages.

Berriri et al., "Easy and Fast Sensor Fault Detection and Isolation Algorithm for Electrical Drives", IEEE Transactions on Power Electronics, vol. 27, No. 2, Feb. 2012, pp. 490-499.

Bahri et al., "FPGA-Based FDI of Faulty Current Sensor in Current Controlled PWM Converters", EUROCON 2007 The International Conference on "Computer as a Tool", Sep. 9-12, 2007, pp. 1679-1686.

Rothenhagen et al., "Current Sensor Fault Detection, Isolation, and Reconfiguration for Doubly Fed Induction Generators", IEEE Transactions on Industrial Electronics, vol. 56, No. 10, Oct. 2009, pp. 4239-4245.

Akrad et al., "Design of a Fault-Tolerant Controller Based on Observers for a PMSM Drive", IEEE Transactions on Industrial Electronics, vol. 58, No. 4, Apr. 2011, pp. 1416-1427.

Foo et al., "A Sensor Fault Detection and Isolation Method in Interior Permanent-Magnet Synchronous Motor Drives Based on an Extended Kalman Filter", IEEE Transactions on Industrial Electronics, vol. 60, No. 8, Aug. 2013, pp. 3485-3495.

"The sixth sense for automotive applications", https://www.google.co.jp/url?sa=t&rct=j&q=&esrc=s&source=web&cd=1&cad=rja&uact=8&ved=0ahUKEwiPopbOqOfLAhXiFqYKHcCNCUsQFggcMAA&url=http%3A%2F%2Fwww.nxp.com%2Fdocuments%2Fbrochure%2F75015728.pdf&usg=AFQjCNGrMUUmjtuS60Nnj_CjTn30hBSaWQ>, retrieval date Aug. 9, 2016, 16 pages.

Ghaderi et al., "Wide-Speed-Range Sensorless Vector Control of Synchronous Reluctance Motors Based on Extended Programmable Cascaded Low-Pass Filters", IEEE Transactions on Industrial Electronics, vol. 58, No. 6, Jun. 2011, pp. 2322-2333.

Chen et al., "Sensorless Control for SPMSM With Concentrated Windings Using Multisignal Injection Method", IEEE Transactions on Industrial Electronics, vol. 61, No. 12, Dec. 2014, pp. 6624-6634.

* cited by examiner

MOTOR CONTROL METHOD, MOTOR CONTROL SYSTEM, AND ELECTRIC POWER STEERING SYSTEM

BACKGROUND OF THE INVENTION

1. Field of the Invention

The present disclosure relates to a motor control method, a motor control system, and an electric power steering system.

2. Description of the Related Art

Recently, an electric drive system has been widely used for various applications. A non-limiting example of the electric drive system is a motor control system. For example, the motor control system controls an electric motor (hereinafter, referred to as a "motor") by vector control. Some current sensors and position sensors are used in the vector control. In the vector control, a position of a rotor is calculated based on a detection value of at least one position sensor. Alternatively, the position of the rotor may be estimated based on, for example, a current flowing through the motor. When one of these sensors for use in the vector control fails, the motor control system malfunctions, and consequently the motor control system cannot recover in many instances. For this reason, there have been actively proposed various methods for detecting a sensor fault in the motor control system.

SUMMARY OF THE INVENTION

In the above conventional technique, a system configuration for sensor fault detection becomes inevitably complicated, which may cause, for example, excessive torque ripple. In the case of particularly using a plurality of sensors, the system configuration becomes further complicated, so that the system configuration is required to be simplified.

Exemplary embodiments of the present disclosure provide a novel motor control method and a novel motor control system each using a sensor fault detection technique capable of simplifying a system configuration.

According to one aspect of the present disclosure, a motor control method includes acquiring at least one measured torque angle based on at least one measured rotor angle measured by at least one position sensor and two estimated torque angles based on two sensorless control algorithms; obtaining all combinations of two torque angles that are combinable with respect to a set of the at least one measured torque angle and the two estimated torque angles and performing an arithmetic operation to determine an error for each combination; selecting a control mode of the motor from a plurality of control modes including a sensor mode, a sensorless mode, and a shutdown mode, the selecting step being performed by referring to a table representing a relationship between the plurality of control modes and a plurality of reference patterns relating to the calculated error group; and controlling the motor in accordance with the selected control mode. The sensor mode is a mode in which motor control is performed using the at least one measured rotor angle, the sensorless mode is a mode in which the motor control is performed using at least one of the two estimated rotor angles that are estimated using the two sensorless control algorithms, and the shutdown mode is a mode in which the motor control is completely shut down.

According to another aspect of the present disclosure, a motor control system includes: a motor; at least one position sensor that detects a rotor angle of the motor; and a control circuit that selects a control mode of the motor and controls the motor in accordance with the selected control mode. The control circuit acquires at least one measured torque angle based on at least one measured rotor angle measured by the at least one position sensor and two estimated torque angles based on two sensorless control algorithms. The control circuit obtains all combinations of two torque angles that are combinable with respect to a set of the at least one measured torque angle and the two estimated torque angles, and performs an arithmetic operation to determine an error for each combination, each error being obtained between two torque angles in each combination. The control circuit selects a control mode of the motor from a plurality of control modes including a sensor mode, a sensorless mode, and a shutdown mode, the selection being performed by referring to a table representing a relationship between the plurality of control modes and a plurality of reference patterns relating to the calculated error group. The control circuit controls the motor in accordance with the selected control mode. The sensor mode is a mode in which motor control is performed using the at least one measured rotor angle, the sensorless mode is a mode in which the motor control is performed using at least one of the two estimated rotor angles that are estimated using the two sensorless control algorithms, and the shutdown mode is a mode in which the motor control is completely shut down.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

With reference to the accompanying drawings, hereinafter, a specific description will be given of a motor control method, a motor control system, and an electric power steering system including the motor control system, according to embodiments of the present disclosure. However, a specific description more than necessary will be occasionally omitted in order to avoid making the following description redundant more than necessary and to facilitate the understanding of a person skilled in the art. For example, a specific description on a well-known matter will be omitted occasionally. In addition, a repetitive description on substantially identical configurations will also be omitted occasionally.

Figure 1:
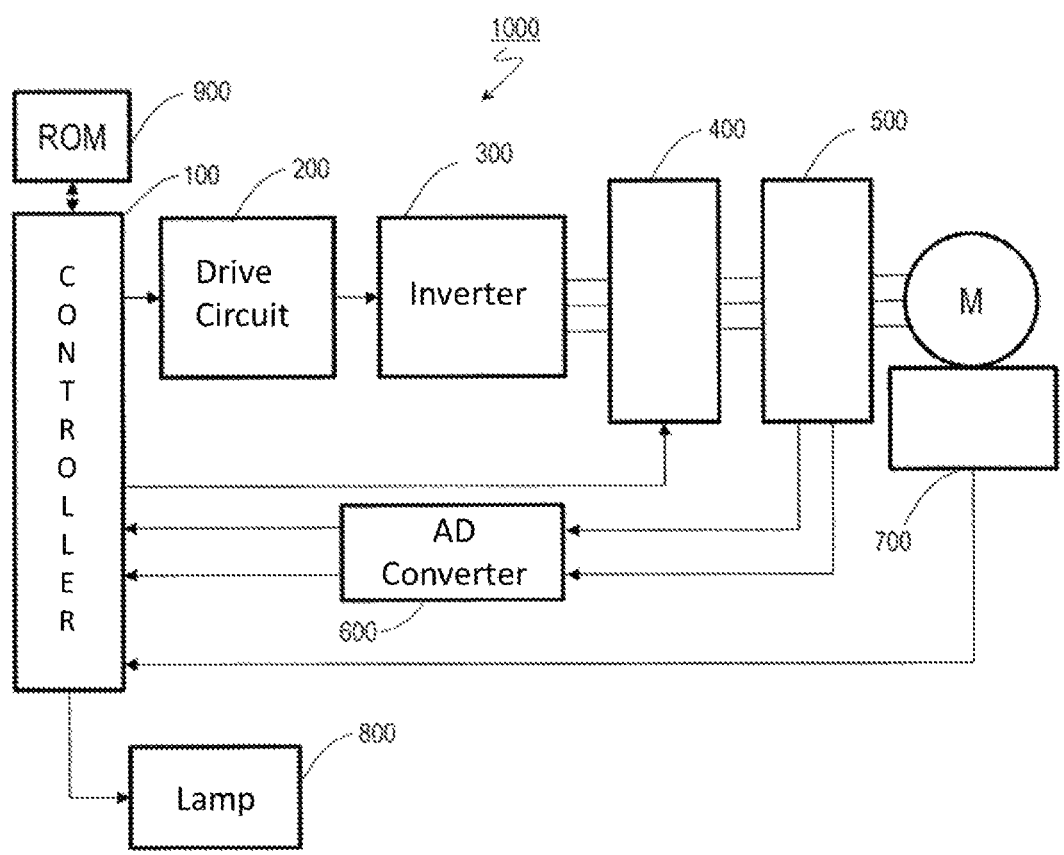
FIG. 1 is a block diagram of a hardware block of a motor control system 1000 according to a first exemplary embodiment of the present invention.

FIG. 1 schematically illustrates hardware blocks of a motor control system 1000 according to a first embodiment.

The motor control system 1000 typically includes a motor M, a controller (control circuit) 100, a drive circuit 200, an inverter (also referred to as an "inverter circuit") 300, a shutdown circuit 400, a plurality of current sensors 500, an analog-to-digital conversion circuit (hereinafter, referred to as an "AD converter") 600, a position sensor 700, a lamp 800, and a read only memory (ROM) 900. For example, the motor control system 1000 may be designed in modules as a power pack, and may be manufactured and sold in the form of a motor module including a motor, a sensor, a driver, and a controller. It should be noted herein that the motor control system 1000 will be described as an exemplary system including as its constituent the motor M. Alternatively, the motor control system 1000 may be a system excluding as its constituent the motor M, the system being configured to drive the motor M.

Examples of the motor M may include a permanent magnet synchronous motor, such as a surface permanent magnet synchronous motor (SPMSM) or an interior permanent magnet synchronous motor (IPMSM), and a three-phase alternating-current motor. For example, the motor M includes three-phase (i.e., U phase, V phase, W phase) wires (not illustrated). The three-phase wires are electrically connected to the inverter 300.

For example, the controller 100 is a micro control unit (MCU). Alternatively, the controller 100 may be a field programmable gate array (FPGA) in which a CPU core is incorporated.

The controller 100 controls the entire motor control system 1000, and controls the torque and rotational speed of the motor M by, for example, vector control. The motor M may be controlled by any closed loop control in addition to the vector control. The rotational speed (unit: rpm) is expressed by the number of revolutions of a rotor per unit time (e.g., one minute). The vector control is a method of decomposing a current flowing through a motor into a current component contributing to generation of a torque and a current component contributing to generation of a magnetic flux, and independently controlling the current components that are perpendicular to each other. For example, the controller 100 sets a target current value in accordance with actual current values measured by the current sensors 500, a rotor angle measured by the position sensor 700 (i.e., an output signal from the position sensor 700), and others. The controller 100 generates a pulse width modulation (PWM) signal, based on the target current value, and then outputs the PWM signal to the drive circuit 200.

The controller 100 detects a sensor fault, and selects a control mode of the motor M, based on a result of the detection. The controller 100 controls the motor M in accordance with the selected control mode. The control mode of the motor M includes a sensor mode, a sensorless mode, and a shutdown mode. A sensor fault detection technique and various control modes will be specifically described later.

The controller 100 selects the sensor mode as the initial control mode. When the controller 100 detects a fault of the position sensor 700, then the controller 100 switches the control mode from the sensor mode to the sensorless mode. In other words, the controller 100 selects the sensorless mode as the control mode when detecting an abnormality in the control in the sensor mode (hereinafter, referred to as "sensor control"). The controller 100 completely stops the motor control system 1000 when detecting the abnormality in the sensor control and the control in the sensorless mode (hereinafter, referred to as "sensorless control").

For example, the controller 100 generates at least one of a shutdown signal and a notification signal. The controller 100 outputs the shutdown signal to the shutdown circuit 400, and outputs the notification signal to the lamp 800. For example, unless the abnormality is generated in the sensor control or the sensorless control, the shutdown signal and the notification signal are negated. When the controller 100 detects the abnormality in both the sensor control and the sensorless control, the controller 100 asserts each of the shutdown signal and the notification signal.

For example, the drive circuit 200 is a gate driver. The drive circuit 200 generates a control signal according to the PWM signal output from the controller 100 in order to control switching operation of a switching element in the inverter 300. It should be noted that the drive circuit 200 may be incorporated in the controller 100 as will be described later.

For example, the inverter 300 converts, into alternating-current power, direct-current power to be supplied from a direct-current power source (not illustrated), and then drives the motor M with the converted alternating-current power. For example, the inverter 300 converts direct-current power into three-phase alternating-current power of U-phase, V-phase, and W-phase pseudo sine waves, based on a control signal to be output from the drive circuit 200. The three-phase alternating-current power thus converted is used for driving the motor M.

For example, the shutdown circuit 400 includes a semiconductor switch element, such as a field-effect transistor (FET, typically a metal-oxide-semiconductor FET (MOSFET)) or an insulated gate bipolar transistor (IGBT), or a mechanical relay. The shutdown circuit 400 is electrically connected between the inverter 300 and the motor M. The shutdown circuit 400 interrupts the electrical connection between the inverter 300 and the motor M, in accordance with the shutdown signal to be output from the controller 100. More specifically, the shutdown signal when being asserted turns off the semiconductor switch element of the shutdown circuit 400, and interrupts the electrical connection between the inverter 300 and the motor M. Consequently, the shutdown circuit 400 stops power supply from the inverter 300 to the motor M.

The current sensors 500 include at least two current sensors that detect at least two of currents flowing through U-phase, V-phase, and W-phase wires of the motor M. In the first embodiment, the current sensors 500 include two current sensors 500A and 500B (see FIG. 2) that detect currents flowing through the U-phase and V-phase wires. Naturally, the current sensors 500 may include three current sensors that respectively detect three currents flowing through the U-phase, V-phase, and W-phase wires. Alternatively, the current sensors 500 may include two current sensors that respectively detect currents flowing through the V-phase and W-phase wires or currents flowing through the W-phase and U-phase wires. For example, each current sensor includes a shunt resistor, and a current detection circuit (not illustrated) that detects a current flowing through the shunt resistor. For example, the shunt resistor has a resistance value of about 0.1Ω.

The AD converter 600 converts by sampling, into digital signals, analog signals to be output from the current sensors 500, and then outputs the converted digital signals to the controller 100. Alternatively, the controller 100 may perform such AD conversion. In this situation, the current sensors 500 directly output analog signals to the controller 100.

The position sensor 700 is disposed on the motor M to detect a position of the rotor. Specifically, the position sensor 700 detects the rotor angle of the motor M, that is, a mechanical angle of the rotor. Examples of the position sensor 700 may include a magnetic sensor, such as a magnetoresistive (MR) sensor including a MR element or a Hall IC (including a Hall element), a resolver, and a rotary encoder. The position sensor 700 outputs a mechanical angle of the rotor to the controller 100. The controller 100 thus acquires the mechanical angle of the rotor.

The motor control system 1000 may include, for example, a speed sensor or an acceleration sensor, instead of the position sensor 700. In cases where a speed sensor is employed as the position sensor, the controller 100 subjects a rotational speed signal or an angular velocity signal to, for example, integration processing, thereby calculating a position of the rotor, that is, an angle of rotation of the rotor. An angular velocity (unit: rad/s) is expressed by an angle of rotation of the rotor per second. In cases where an acceleration sensor is employed as the position sensor, the controller 100 subjects an angular acceleration signal to, for example, integration processing, thereby calculating an angle of rotation of the rotor. As used herein, the position sensor may include any sensor configured to acquire a rotor angle. Examples of the position sensor may include the magnetic sensor, the speed sensor, and the acceleration sensor each described above. In addition, the term "acquire" involves, for example, receiving a mechanical angle of a rotor from the outside, and acquiring a mechanical angle of a rotor in such a manner that the controller 100 calculates the mechanical angle.

For example, the lamp 800 includes a light emitting diode (LED). For example, when the controller 100 asserts a notification signal, the lamp 800 lights up red in response to this assertion. For example, consideration is given to a situation in which the motor control system 1000 is installed in a vehicle. In this situation, the lamp 800 may be mounted on an instrument panel of a dashboard in addition to meters such as a speedometer and a tachometer.

Examples of the ROM 900 may include a programmable memory (e.g., a programmable read only memory (PROM)), a reprogrammable memory (e.g., a flash memory), and a read-only memory. The ROM 900 stores therein a control program including a group of commands that cause the controller 100 to control the motor M. For example, in booting the motor control system 1000, the control program is once developed onto a random access memory (RAM) (not illustrated). It should be noted that the ROM 900 is not necessarily disposed outside the controller 100 as an external unit, but may be incorporated in the controller 100. For example, the controller 100, in which the ROM 900 is incorporated, may be the MCU described above.

Figure 2:
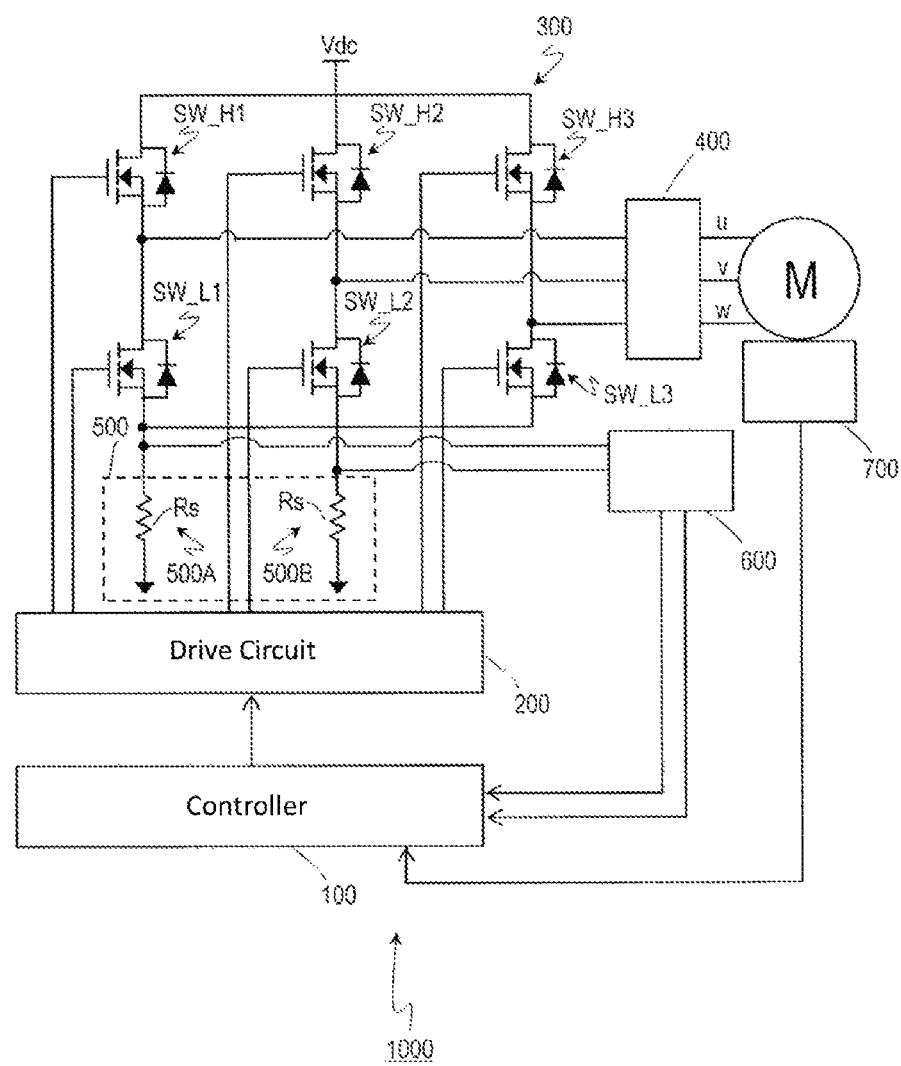
FIG. 2 is a block diagram of a hardware configuration of an inverter 300 in the motor control system 1000 according to the first exemplary embodiment of the present invention.

With reference to FIG. 2, a specific description will be given of a hardware configuration of the inverter 300.

FIG. 2 schematically illustrates the hardware configuration of the inverter 300 in the motor control system 1000 according to the first embodiment.

The inverter 300 includes three lower-arm switching elements and three upper-arm switching elements. In FIG. 2, switching elements SW_L1, SW_L2, and SW_L3 correspond to the lower-arm switching elements, and switching elements SW_H1, SW_H2, and SW_H3 correspond to the upper-arm switching elements. Examples of each switching element may include a FET and an IGBT. Each switching element includes a freewheeling diode that allows a flow of regenerative current toward the motor M.

FIG. 2 illustrates shunt resistors Rs of the two current sensors 500A and 500B that respectively detect currents flowing through the U-phase and V-phase wires. As illustrated in FIG. 2, for example, the shunt resistors Rs may be electrically connected between the lower-arm switching elements and the ground. Alternatively, for example, the shunt resistors Rs may be electrically connected between the upper-arm switching elements and the power source.

For example, the controller 100 performs three-phase energization control using the vector control, thereby driving the motor M. For example, the controller 100 generates a PWM signal for the three-phase energization control, and outputs the PWM signal to the drive circuit 200. The drive circuit 200 generates, based on the PWM signal, a gate control signal for controlling the switching operation of each FET in the inverter 300, and then sends the gate control signal to the gate of each FET.

Figure 3:
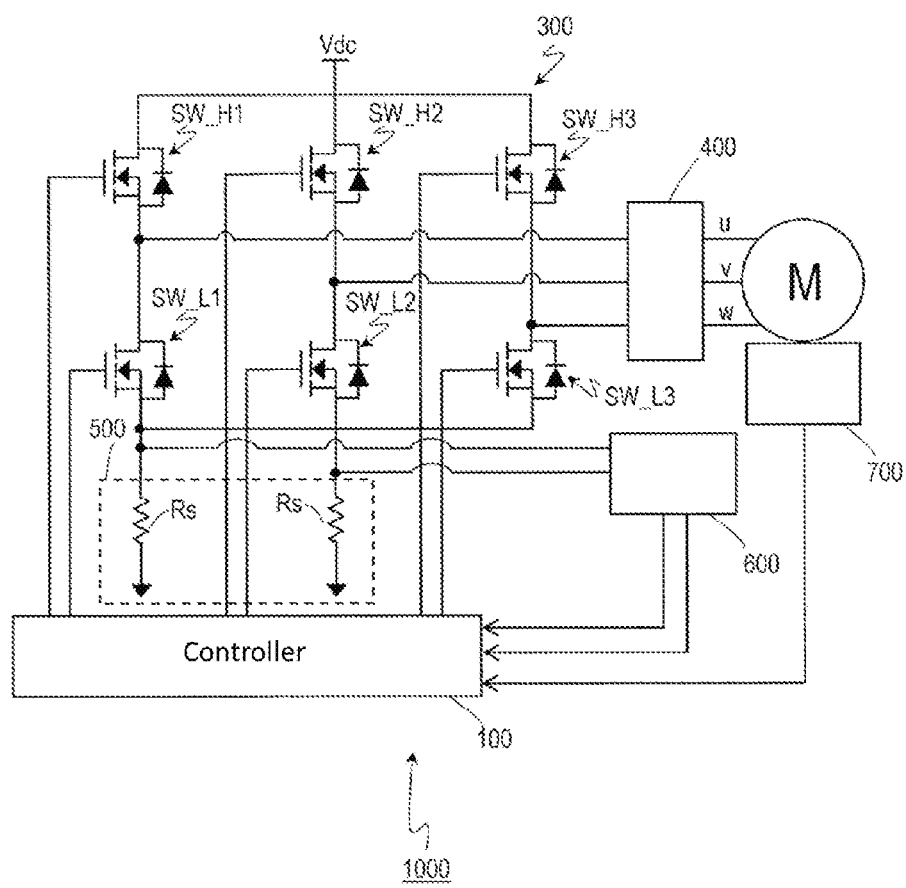
FIG. 3 is a block diagram of a hardware block of the motor control system 1000 according to a modification of the first exemplary embodiment of the present invention.

FIG. 3 schematically illustrates hardware blocks of the motor control system 1000 according to a modification of the first embodiment.

As illustrated in FIG. 3, the motor control system 1000 does not necessarily include the drive circuit 200. In this situation, the controller 100 includes ports for directly controlling the switching operations of the respective FETs in the inverter 300. Specifically, the controller 100 generates a gate control signal based on a PWM signal. The controller 100 outputs the gate control signal through each port, thereby sending the gate control signal to the gate of each FET.

Prior to a description on an algorithm of sensor fault detection, first, a sensor fault according to the present disclosure will be described with reference to FIGS. 4 to 6 by taking the detection of the rotor angle using a MR sensor 710 and a sensor magnet 720, for example. The sensor fault includes a fault of the position sensor 700 and a fault of each of the current sensors 500. As used herein, the sensor fault mainly refers to the former fault. For example, the fault of the current sensor includes a breakage of a shunt resistor.

Figure 4:
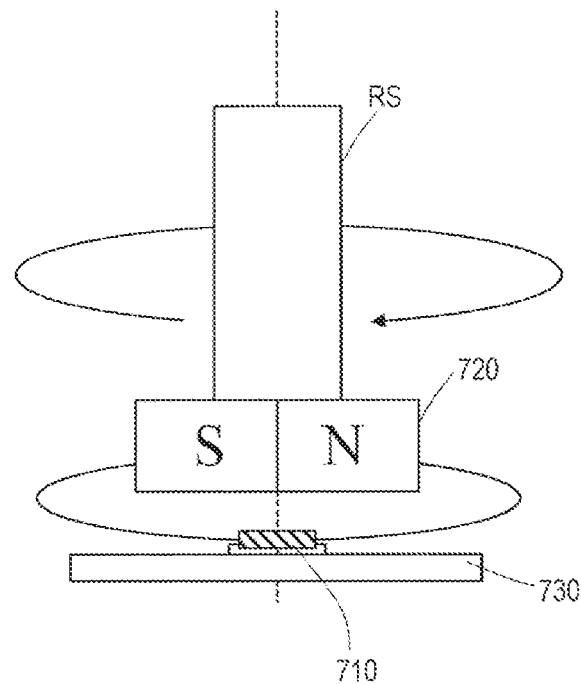
FIG. 4 is a schematic diagram of a configuration to detect a rotor angle using an MR sensor 710 and a sensor magnet 720.
Figure 5:
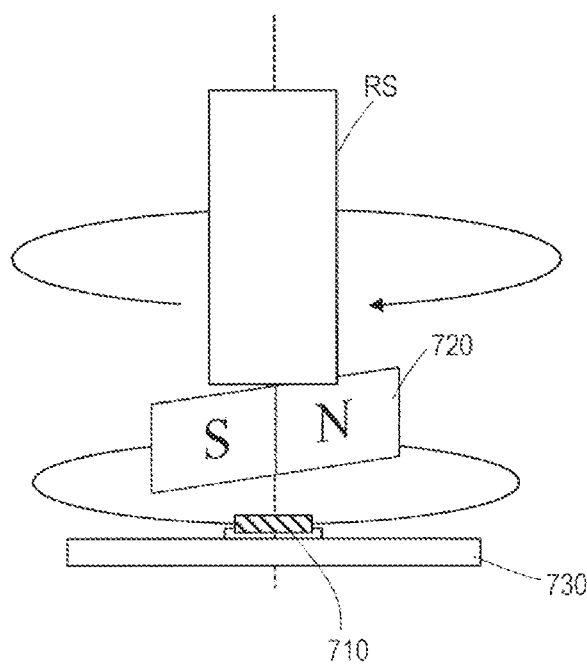
FIG. 5 is a schematic diagram of positional displacement of the sensor magnet 720.

FIG. 4 schematically illustrates a configuration for detecting the rotor angle using the MR sensor 710 and the sensor magnet 720. FIG. 5 schematically illustrates positional displacement of the sensor magnet 720.

In the first embodiment, one MR sensor 710 is used as the position sensor. For example, the MR sensor 710 is mounted on a circuit board 730 of the motor M. On the other hand, the sensor magnet 720 is formed by injection molding on a shaft RS of the motor. The sensor magnet 720 is thus firmly fixed to the shaft RS. For example, the above configuration is adopted in a motor control system for an inexpensive electric power steering (EPS) system in an automobile. As the shaft RS rotates, the sensor magnet 720 also rotates. Therefore, the MR sensor 710 detects a change in magnetic flux caused by a change in position of the magnetic pole.

Typically, the sensor magnet 720 is firmly fixed to the shaft RS. However, if a vehicle such as an automobile undergoes any strong impact from the outside (e.g., an impact to be caused when a vehicle runs up onto a curb), this impact is transmitted to the shaft RS, which may result in breakage or deformation of the sensor magnet 720. Alternatively, as illustrated in FIG. 5, for example, the sensor magnet 720 can rotate around the rotation axis of the shaft RS. Consequently, this impact may cause positional displacement of the sensor magnet 720. Once the positional displacement occurs, it is difficult to return the sensor magnet 720 to an original position. The breakage, deformation, or positional displacement makes the MR sensor 710 difficult to accurately detect a rotor angle. As used herein, the fault of the position sensor includes the breakage, deformation, or positional displacement of the sensor magnet 720, in addition to the fault of the position sensor (e.g., the MR sensor 710).

Figure 6:
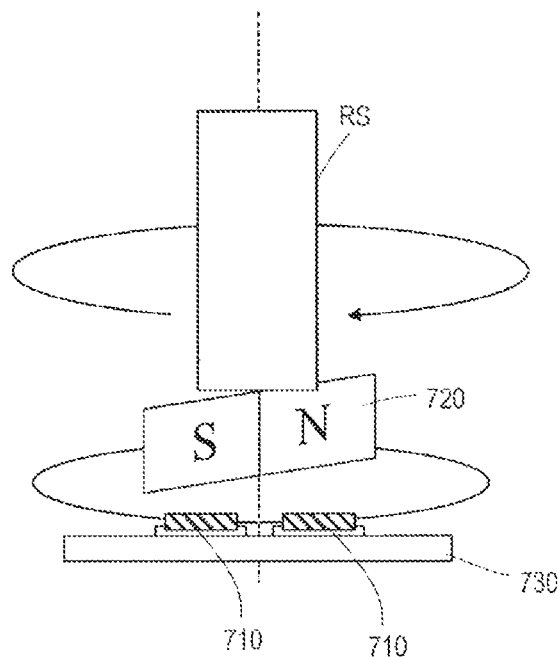
FIG. 6 is a schematic diagram of a configuration to detect the rotor angle using two MR sensors 710 and the sensor magnet 720.

FIG. 6 schematically illustrates a configuration for detecting the rotor angle using the two MR sensors 710 and the sensor magnet 720.

As illustrated in FIG. 4, for example, the rotor angle is detected using at least one MR sensor 710 in the typical motor control system. On the other hand, for example, in a motor control system for a high-performance EPS system, at least two MR sensors are used at the request of automotive functional safety standard (ISO 26262) or the like. For example, the two MR sensors 710 are conventionally used as illustrated in FIG. 6.

Redundant design and a fault countermeasure such that the motor is continuously driven using one of sensors even if the other sensor fails are initiatively adopted for an automotive motor in, for example, a high-performance EPS system. When the sensor fault does not occur, outputs from the two MR sensors 710 are equal to each other. When at least one of the two MR sensors 710 fails, the outputs from the two MR sensors 710 take different values. As described above, the occurrence of the sensor fault is determined by comparing the outputs from the two MR sensors 710. However, if the position of the sensor magnet 720 is displaced as illustrated in FIG. 6, the outputs from the two MR sensors 710 take the same value regardless of the sensor fault. However, the outputs from the two MR sensors 710 are not appropriate. Thus, the sensor fault caused by the positional displacement of the sensor magnet 720 is hardly detected by the conventional technique of comparing the outputs from the two MR sensors 710.

From the viewpoint of improving safety of the EPS system, if possible, it is preferable to avoid continuously driving the motor in the state in which the sensor fault occurs at the motor control system 1000, in order to prevent an unexpected torque fluctuation. For this reason, it is necessary to detect or estimate the abnormality of the sensor control due to, for example, the breakage of the sensor magnet 720. When the sensor control cannot be performed, for example, preferably the motor control is switched from the sensor control to the sensorless control to continuously drive the motor. This switching allows the EPS system to continuously assist a steering operation of the driver.

When both the sensor control and the sensorless control cannot be performed, preferably the EPS system, that is, the motor control system 1000 is stopped. This enables further improvement of the safety of the EPS system. As described above, it is desirable to take the measures to detect the sensor fault and to appropriately switch the control mode based on the detection result, for the EPS motor control system for which the safety is particularly required.

With reference to FIGS. 7 to 10, a specific description will be given of the algorithm of sensor fault detection according to the first embodiment.

The algorithm of motor control employing the sensor fault detection technique according to the first embodiment may be implemented with only hardware such as an application specific integrated circuit (ASIC) or a FPGA, or may be implemented by a combination of hardware with software.

Figure 7:
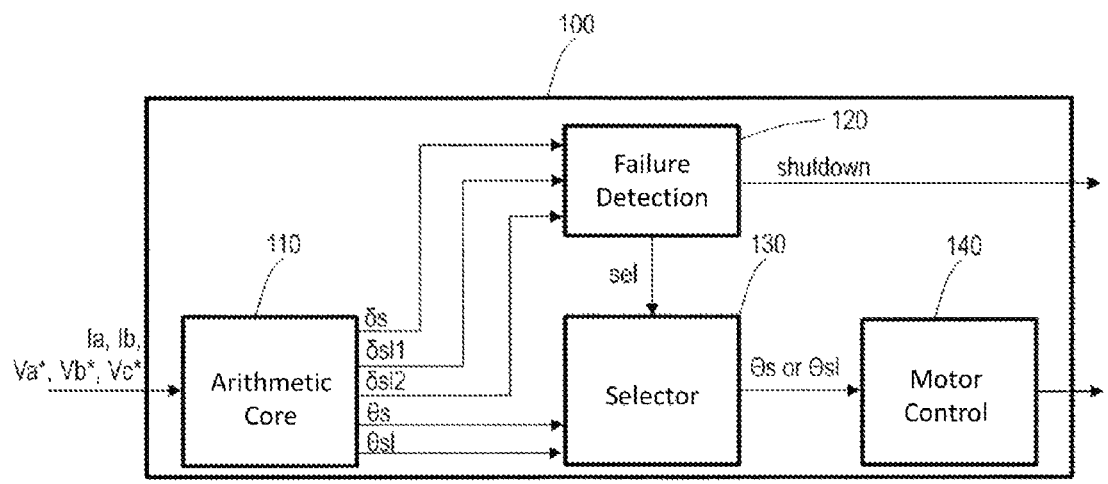
FIG. 7 is a functional block diagram of a functional block of a controller 100.

FIG. 7 schematically illustrates functional blocks of the controller 100. As used herein, each block is not illustrated on a hardware basis, but is illustrated on a functional block basis in the functional block diagram. For example, the software may be a module constituting a computer program for executing specific processing corresponding to each functional block.

For example, the controller 100 includes an arithmetic core unit 110, a fault detection unit 120, a selector 130, and a motor control unit 140. As used herein, each functional block is referred to as a "unit" for convenience of the description. Naturally, the term "unit" is not used to limit and interpret each functional block to and as hardware or software.

In cases where the respective functional blocks are mounted as software in the controller 100, the software may be executed by, for example, a core of the controller 100. As described above, the controller 100 may be implemented with a FPGA. In this situation, all of or some of the functional blocks may be implemented by hardware. In addition, when the processing is executed in a decentralization manner using a plurality of FPGAs, load of calculation on a specific computer is decentralized. In this situation, all of or some of the functional blocks illustrated in FIG. 7 may be mounted in the plurality of FPGAs separately. The FPGAs are interconnected by, for example, an on-board control area network (CAN) to exchange data with one another.

For example, the arithmetic core unit 110 acquires currents $I_a$ and $I_b$, and reference voltages $V_a^*$, $V_b^*$, and $V_c^*$ and performs various arithmetic operations, thereby generating a measured torque angle $\delta_s$, estimated torque angles $\delta_{s11}$ and $\delta_{s12}$, a measured rotor angle $\theta_s$, and an estimated rotor angle $\theta_{s1}$. The measured torque angle $\delta_s$ and the estimated torque angle $\delta_{s11}$ and $\delta_{s12}$ are output to the fault detection unit 120. The measured rotor angle $\theta_s$ and the estimated rotor angle $\theta_{s1}$ are output to the selector 130. As used herein, a current $I_a$ flows through the U-phase wire of the motor M, a current $I_b$ flows through the V-phase wire of the motor M, and a current $I_c$ flows through the W-phase wire of the motor M.

According to the three-phase energization control, a sum of the three-phase currents is zero. In other words, a relation to be satisfied is that a sum of the currents $I_a$, $I_b$, and $I_c$ is zero. The arithmetic core unit 110 receives two of the currents $I_a$, $I_b$, and $I_c$, and calculates a remaining one of the currents $I_a$, $I_b$, and $I_c$. In the first embodiment, the arithmetic core unit 110 acquires the current $I_a$ measured by the current sensor 500A and the current $I_b$ measured by the current sensor 500B. The arithmetic core unit 110 calculates the current $I_c$, based on the currents $I_a$ and $I_b$, using the relation that the sum of the currents $I_a$, $I_b$, and $I_c$ is zero. The arithmetic core unit 110 thus acquires the currents $I_a$, $I_b$, and $I_c$. The currents $I_a$, $I_b$, and $I_c$ measured using three current sensors may be input to the arithmetic core unit 110.

The arithmetic core unit 110 transforms the currents $I_a$, $I_b$, and $I_c$ into a current $I_\alpha$ on the $\alpha$ axis and a current $I_\beta$ on the $\beta$ axis in the $\alpha\beta$ fixed coordinate system, by so-called Clarke transformation for use in, for example, the vector control. The $\alpha\beta$ fixed coordinate system is a stationary coordinate system. The $\alpha$ axis extends in a direction of one of three phases (e.g., a U-phase direction), and the $\beta$ axis extends in a direction perpendicular to the $\alpha$ axis.

The arithmetic core unit 110 also transforms the currents $I_\alpha$ and $I_\beta$ into a current $I_d$ on the d axis and a current $I_q$ on the q axis in the dq rotating coordinate system, by so-called Park transformation for use in, for example, the vector control. This Park transformation is performed based on an electrical angle $\theta_e$ of the rotor. The dq rotating coordinate system refers to a rotating coordinate system that rotates together with a rotor. Specifically, the arithmetic core unit 110 converts, into the electrical angle $\theta_e$, a mechanical angle $\theta_m$ of the rotor measured by the position sensor 700, based on Equation (1). The arithmetic core unit 110 sets the electrical angle $\theta_e$ as the measured rotor angle $\theta_s$, and outputs the measured rotor angle $\theta_s$ to the selector 130.

$$\theta_e = (P/2) \cdot \theta_m \qquad \text{Equation (1)}$$

In Equation (1), P represents the number of poles.

The arithmetic core unit 110 transforms the reference voltages $V_a^*$, $V_b^*$, and $V_c^*$ into a reference voltage $V_\alpha^*$ on the $\alpha$ axis and a reference voltage $V_\beta^*$ on the $\beta$ axis in the $\alpha\beta$ fixed coordinate system, by the Clarke transformation. The reference voltages $V_a^*$, $V_b^*$, and $V_c^*$ respectively represent the PWM signals for controlling the switching elements in the inverter 300.

Figure 8:
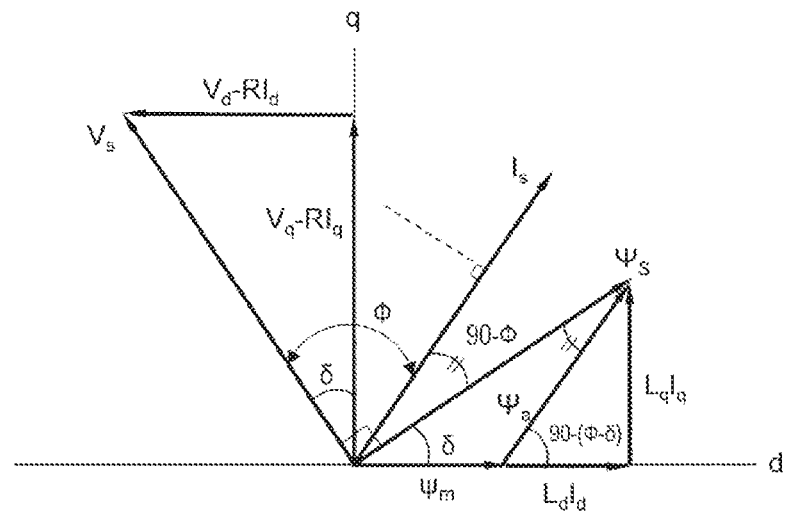
FIG. 8 is a vector diagram in a dq rotating coordinate system.

FIG. 8 is a vector diagram in the dq rotating coordinate system.

As illustrated in FIG. 8, the arithmetic core unit 110 calculates a component $BEMF_\alpha$ on the $\alpha$ axis and a component $BEMF_\beta$ on the $\beta$ axis in the dq rotating coordinate system, as to a counter electromotive force vector (magnitude $V_s$). More specifically, the arithmetic core unit 110 calculates the component $BEMF_\alpha$ as a function of the current $I_\alpha$ and the reference voltage $V_\alpha^*$, based on Equation (2). In addition, the arithmetic core unit 110 calculates the component $BEMF_\beta$ as a function of the current $I_\beta$ and the reference voltage $V_\beta^*$, based on Equation (2).

$$BEMF_\alpha = V_\alpha^* - R \cdot I_\alpha, BEMF_\beta = V_\beta^* - R \cdot I_\beta \qquad \text{Equation (2)}$$

In Equation (2), R represents an armature resistance. For example, the armature resistance R is set for the arithmetic core unit 110 by the core of the controller 100.

The arithmetic core unit 110 calculates a magnitude BEMF ($=V_s$) of the counter electromotive force vector, based on Equation (3).

$$BEMF = (BEMF_\alpha^2 + BEMF_\beta^2)^{1/2} \qquad \text{Equation (3)}$$

The arithmetic core unit 110 calculates the measured torque angle $\delta_s$, based on Equation (4). This calculation enables acquisition of the measured torque angle $\delta_s$ based on the measured rotor angle $\theta_s$ measured by the position sensor 700. A torque angle is also typically referred to as a load angle. As illustrated in FIG. 8, the load angle $\delta$ is, for example, an angle between the counter electromotive force vector and the q axis in the dq rotating coordinate system with a counterclockwise direction defined as a positive direction.

$$\delta_s = \tan^{-1}[(V_d - R \cdot I_d)/(V_q - R \cdot I_q)] \qquad \text{Equation (4)}$$

In Equation (4), $V_d$ represents a d-axis component of an armature voltage, and $V_q$ represents a q-axis component of the armature voltage.

The arithmetic core unit 110 calculates the estimated torque angles $\delta_{s11}$ and $\delta_{s12}$, based on two different sensorless control algorithms. For example, the arithmetic core unit 110 calculates the estimated torque angles $\delta_{s11}$ and $\delta_{s12}$, based on Equations (5) and (6). This calculation enables acquisition of the two estimated torque angles $\delta_{s11}$ and $\delta_{s12}$.

$$\delta_{s11} = \sin^{-1}[(L \cdot I_s \cdot \cos \Phi)/\Psi_m] \qquad \text{Equation (5)}$$

$$\delta_{s12} = \cot^{-1}\{[\Psi_s/(L \cdot I_s \cdot \cos \Phi)] - \tan \Phi\} \qquad \text{Equation (6)}$$

In Equations (5) and (6), L represents an armature inductance, and $I_s$ represents the magnitude of the armature current vector in FIG. 8. The angle $\Phi$ represents the angle between the armature current vector and the counter electromotive force vector in FIG. 8. In FIG. 8, $\Psi_m$ represents a magnitude of a vector of a magnetic flux (referred to as a "magnet flux") caused by the permanent magnet of the rotor, and $\Psi_a$ represents a magnitude of a magnetic flux (referred to as an "armature flux") generated by the wire of the stator. Also in FIG. 8, $\Psi_s$ represents a magnitude of the composite magnetic flux vector obtained by compounding the magnet flux vector and the armature magnetic flux vector.

The sensorless control algorithm according to the present disclosure is not limited to the technique employing the arithmetic expressions described above. Various known techniques may widely be adopted. For example, the technique disclosed in Non-patent Literature 1 may be used. A technique of detecting the sensor fault by estimating the torque angle using a plurality of different techniques falls within the scope of the present disclosure.

Figure 9:
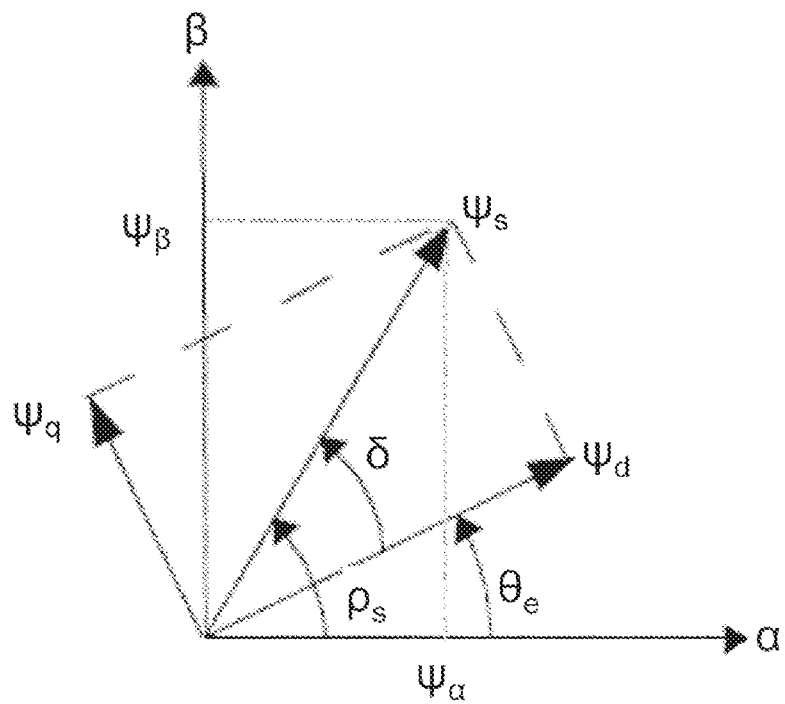
FIG. 9 is a diagram of a relationship among an electrical angle θe, a load angle δ, an estimated phase angle ρs, and a composite magnetic flux vector.

FIG. 9 illustrates the relationship among the electrical angle $\theta_e$, the load angle $\delta$, an estimated phase angle $\rho_s$, and the composite magnetic flux vector.

As illustrated in FIG. 9, for example, the estimated phase angle $\rho_s$ is an angle that is defined by an angle formed between the composite magnetic flux vector and the $\alpha$ axis in the $\alpha\beta$ fixed coordinate system with the counterclockwise direction defined as the positive direction. The estimated phase angle $\rho_s$ is obtained based on Equation (7).

$$\rho_s = \tan^{-1}(\Psi_\beta/\Psi_\alpha) \qquad \text{Equation (7)}$$

A relation of $BEMF_\alpha/BEFM=\Psi^\beta/\Psi_s$ and a relation of $BEMF_\beta/BEFM=\Psi_\alpha/\Psi_s$ are established between the counter electromotive force and the magnetic flux. Equation (8) is derived by changing Equation (7) using this relations. The arithmetic core unit 110 calculates the estimated phase angle $\rho_s$, based on Equation (8).

$$\rho_s = \tan^{-1}(BEMF_\beta/BEMF_\alpha) \quad \text{Equation (8)}$$

For example, the arithmetic core unit 110 calculates two estimated rotor angles $\theta_{s11}$ and $\theta_{s12}$, based on Equation (9). The arithmetic core unit 110 generates the estimated rotor angle $\theta_{s1}$ using at least one of the two estimated rotor angles $\theta_{s11}$ and $\theta_{s12}$. Specifically, the arithmetic core unit 110 may determine the estimated rotor angle $\theta_{s11}$ or $\theta_{s12}$ as the estimated rotor angle $\theta_{s1}$, or may determine an average value of the two estimated rotor angles $\theta_{s11}$ and $\theta_{s12}$ as the estimated rotor angle $\theta_{s1}$.

$$\theta_{s11}=\rho_s-\delta_{s11}, \theta_{s12}=\rho_s-\delta_{s12} \quad \text{Equation (9)}$$

Figure 10:
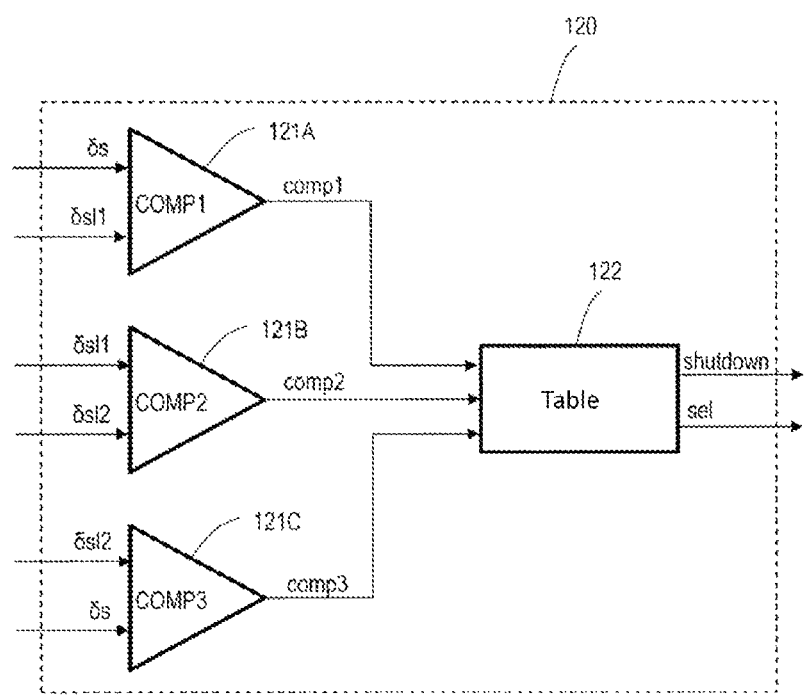
FIG. 10 is a specific diagram of a functional block of a fault detection unit 120.

With reference to FIG. 10, next, a specific description will be given of the fault detection unit 120.

FIG. 10 schematically illustrates functional blocks of the fault detection unit 120.

The fault detection unit 120 receives the measured torque angle $\delta_s$ and the estimated torque angles $\delta_{s11}$ and $\delta_{s12}$ from the arithmetic core unit 110, and generates a shutdown signal, a notification signal, and an SEL signal. The fault detection unit 120 includes three comparators 121A, 121B, and 121C and a table 122. A so-called voting system is adopted for the fault detection unit 120.

Each comparator includes two inputs and one output. Each comparator calculates an error of the two inputs, and compares the error to a predetermined allowable value (Angle Max). For example, each comparator outputs a high-level (Hi) digital signal "1" when the error is equal to or more than the predetermined allowable value. Each comparator outputs a low-level (Lo) digital signal "0" when the error is less than the predetermined allowable value. For example, the predetermined allowable value may be determined in consideration of the required sensitivity of the motor control system. For example, the predetermined allowable value may be set at about 10°. An allowable error becomes larger by setting the predetermined allowable value higher, and the allowable error becomes smaller by setting the predetermined allowable value lower.

The fault detection unit 120 obtains all combinations of two torque angles that can be combined with respect to a set of one measured torque angle $\delta_s$ and two estimated torque angles $\delta_{s11}$ and $\delta_{s12}$, and performs the arithmetic operation to determine the error for each combination. In this example, three combinations $\{(\delta_s, \delta_{s11}), (\delta_{s11}, \delta_{s12}), (\delta_{s12}, \delta_s)\}$ are obtained for a set of three inputs.

The measured torque angle $\delta_s$ and the estimated torque angle $\delta_{s11}$ are input to the comparator 121A. The comparator 121A calculates the error between the measured torque angle $\delta_s$ and the estimated torque angle $\delta_{s11}$, and outputs a signal comp1 corresponding to the result of the comparison between the error and the predetermined allowable value. The comparator 121B receives two estimated torque angles $\delta_{s11}$ and $\delta_{s12}$. The comparator 121B calculates the error between the two estimated torque angles $\delta_{s11}$ and $\delta_{s12}$, and outputs a signal comp2 corresponding to the result of the comparison between the error and the predetermined allowable value. The comparator 121C receives the estimated torque angle $\delta_{s12}$ and the measured torque angle $\delta_s$. The comparator 121C calculates an error between the estimated torque angle $\delta_{s12}$ and the measured torque angle $\delta_s$, and outputs a signal comp3 corresponding to the result of the comparison between the error and the predetermined allowable value.

The table 122 represents a relationship between a plurality of control modes and a plurality of reference patterns relating to a calculated error group. The signals comp1, comp2, and comp3 constitute the error group. The control modes include the sensor mode, the sensorless mode, and the shutdown mode.

(1) The sensor mode is a mode in which the motor control is performed using at least one measured rotor angle $\theta_s$. In the first embodiment, the sensor mode is a mode in which the motor control is performed using one measured rotor angle $\theta_s$.

(2) The sensorless mode is a mode in which the motor control is performed using at least one of the two estimated rotor angles $\theta_{s11}$ and $\delta_{s12}$ that are estimated using the two sensorless control algorithms.

(3) The shutdown mode is a mode in which the motor control is completely shut down.

Table 1 shows a specific relationship between the three control modes and the plurality of reference patterns in the first embodiment. The fault detection unit 120 refers to the table 122 to select the control mode of the motor from the three control modes.

TABLE 1

|  | comp1 | comp2 | comp3 |
|---|---|---|---|
| Sensorless mode | Hi | Lo | Hi |
| Shutdown mode | Hi | Hi | Hi |
| Sensor mode |  | Other Cases |  |

When all of the three signals comp1, comp2, and comp3 in the error group are at the high level, namely, when all the errors of the three combinations are equal to or more than the predetermined allowable value, the fault detection unit 120 selects the shutdown mode, and asserts the shutdown signal and the notification signal to "1". The shutdown signal is output to the shutdown circuit 400 (see FIG. 1). The motor control system 1000 thus stops. The notification signal is output to the lamp 800. The lamp 800 blinks based on the notification signal to issue an alarm (call attention) to a driver as to occurrence of a sensor fault.

For example, consideration is given to a situation in which the motor control system is used for an EPS system. In this situation, the shutdown signal completely stops the motor control system 1000 to prevent erroneous operation of the motor control system 1000 by the sensor control and sensorless control. In addition, the notification signal causes an alarm lamp to light up and blink, so that the alarm lamp promptly issues an alarm to a driver as to occurrence of a fault. In accordance with the alarm, the driver safely pulls an automobile to, for example, the shoulder of a road while carefully performing a steering operation. As described above, the shutdown signal and the notification signal secure the safety of the driver.

In the three signals comp1, comp2, and comp3 of the error group, when the signal comp2 is at the low level while at least one of the remaining two signals comp1 and comp3 is at the high level, the fault detection unit 120 detects the sensorless mode. At this time, the fault detection unit 120 generates a sel signal indicating, for example, "1", and outputs the sel signal to the selector 130. The shutdown signal and the notification signal are maintained in the negated state.

The high-level signals comp1 and comp3 indicate that the values of the two estimated rotor angles $\theta_{s11}$ and $\theta_{s12}$ are not valid. This phenomenon may occur due to the fault of the current sensor 500 that measures the armature current necessary for the sensorless control algorithm.

On a condition other than the above conditions, the fault detection unit 120 selects the sensor mode, and maintains the sensor control. At this time, the fault detection unit 120 generates the sel signal indicating, for example, "0", and outputs the sel signal to the selector 130. The shutdown signal and the notification signal are maintained in the negated state.

Referring again to FIG. 7, the functional blocks of the controller 100 are described.

The selector 130 receives the measured rotor angle $\theta_s$ and the estimated rotor angle $\theta_{s1}$. The selector 130 outputs the measured rotor angle $\theta_s$ or the estimated rotor angle $\theta_{s1}$ to the motor control unit 140 in accordance with the sel signal. Specifically, the selector 130 selects the measured rotor angle $\theta_s$ when the sel signal indicates "0", and the selector 130 selects the estimated rotor angle $\theta_{s1}$ when the sel signal indicates "1". Consequently, the rotor angle corresponding to the detection result of the fault detection unit 120 is output to the motor control unit 140.

For example, the motor control unit 140 performs the arithmetic operation required for the typical vector control. It should be noted that the vector control is a known technique; therefore, the specific description thereof will not be given here. The motor control unit 140 is capable of controlling the motor M by the sensor control or the sensorless control. The motor control unit 140 normally performs the sensor control using the measured rotor angle $\theta_s$ in the sensor mode. When the fault detection unit 120 detects the abnormality of the sensor control, the motor control unit 140 performs the sensorless control using the estimated rotor angle $\delta_{s1}$ in the sensorless mode.

The motor control unit 140 may have a function of transforming the currents $I_a$, $I_b$, and $I_c$ into the currents $I_\alpha$ and $I_\beta$ by Clarke transformation for the purpose of the vector control. The motor control unit 140 may further have a function of transforming the currents $I_\alpha$ and $I_\beta$ into the currents $I_d$ and $I_q$ by Park transformation. In this situation, instead of the operation performed by the arithmetic core unit 110, the arithmetic core unit 110 may acquire at least one of the currents $I_\alpha$ and $I_\beta$ and the currents $I_d$ and $I_q$ from the motor control unit 140.

According to the first embodiment, the abnormality of the sensor control and the sensorless control is detected using the simplified algorithm, and the motor control system is stopped under the predetermined conditions. As a result, the safety of the motor control system is further improved.

Figure 11:
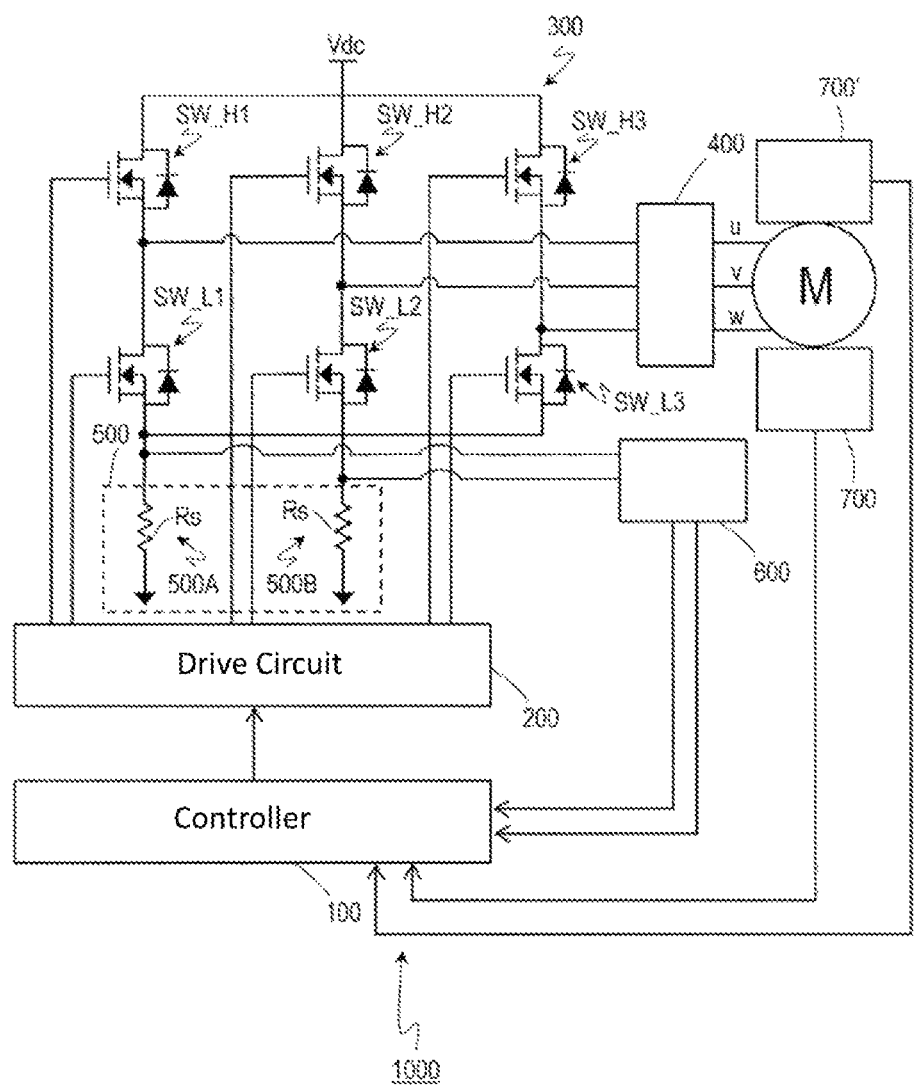
FIG. 11 is a block diagram of a hardware configuration of a motor control system 1000 including two position sensors 700 according to a second exemplary embodiment of the present invention.

FIG. 11 schematically illustrates a hardware configuration of a motor control system 1000 including two position sensors 700 according to a second embodiment.

A motor control system according to the present disclosure may include at least one position sensor 700. For example, as illustrated in FIG. 11, the motor control system 1000 for the EPS system according to the second embodiment includes two position sensors 700. In this situation, an arithmetic core unit 110 calculates two measured torque angles $\delta_{s1}$ and $\delta_{s2}$ based on two measured rotor angles $\theta_{s1}$ and $\theta_{s2}$ measured by the two position sensors 700, in accordance with the procedure described above. The two measured torque angles $\delta_{s1}$ and $\delta_{s2}$ are output to the fault detection unit 120. In the second embodiment, the arithmetic core unit 110 may determine the measured rotor angle $\theta_{s1}$ or $\theta_{s2}$ as a measured rotor angle $\theta_s$, or may determine an average value of the measured rotor angles $\theta_{s1}$ and $\theta_{s2}$ as the measured rotor angle $\theta_s$.

Figure 12:
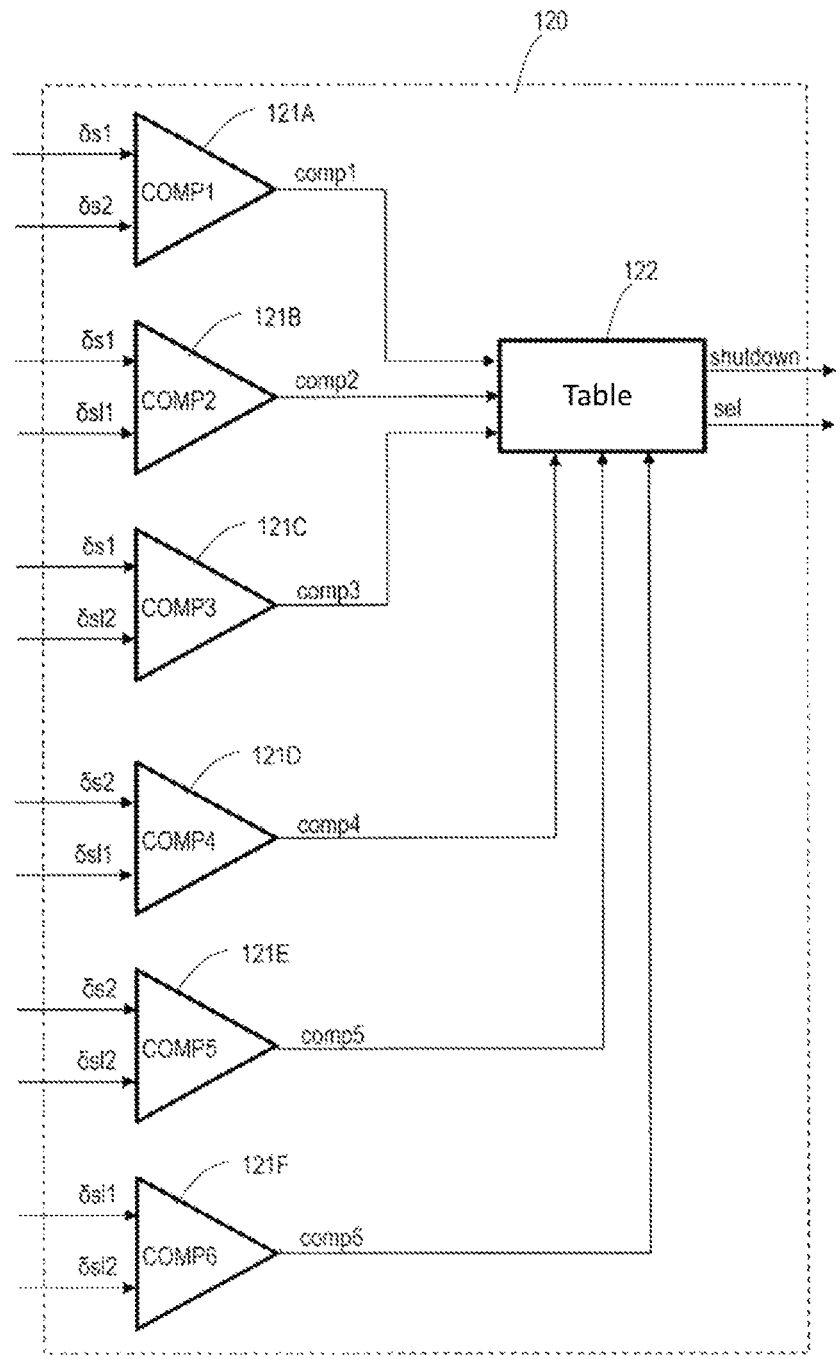
FIG. 12 is a specific diagram of the functional block of the fault detection unit 120 in a case where the two position sensors 700 are used.

FIG. 12 schematically illustrates specific functional blocks of the fault detection unit 120 in the case where the two position sensors 700 are used.

The fault detection unit 120 may obtain all the combinations of two torque angles that can be combined with respect to a set of the two measured torque angles $\delta_{s1}$ and $\delta_{s2}$ and the two estimated torque angles $\delta_{s11}$ and $\delta_{s12}$ and perform an arithmetic operation to determine an error for each combination In this example, six combinations $\{(\delta_{s1}, \delta_{s2}), (\delta_{s1}, \delta_{s11}), (\delta_{s1}, \delta_{s12}), (\delta_{s2}, \delta_{s11}), (\delta_{s2}, \delta_{s12}), (\delta_{s11}, \delta_{s12})\}$ are obtained for a set of four inputs.

In the second embodiment, the fault detection unit 120 includes six comparators 121A to 121F corresponding to the six combinations. The six comparators 121A to 121F output six signals comp1 to comp6 in accordance with the comparison result.

Table 2 shows a specific relationship between three control modes and a plurality of reference patterns in the second embodiment.

TABLE 2

|  | comp1 | comp2 | comp3 | comp4 | comp5 | comp6 |
|---|---|---|---|---|---|---|
| Sensorless mode | Hi | Hi | Hi | Lo | Lo | Lo |
|  | Hi | Lo | Lo | Hi | Hi | Lo |
|  | Hi | Hi | Hi | Hi | Hi | Lo |
| Shutdown mode | Hi | Hi | Hi | Hi | Hi | Hi |
| Sensor mode | Other Cases | | | | | |

When all of the six signals comp1 to comp6 in the error group are at a high level, namely, when all the errors of the six combinations are equal to or more than a predetermined allowable value, the fault detection unit 120 selects a shutdown mode, and asserts a shutdown signal and a notification signal to "1".

In Table 2, an upper stage of a sensorless mode shows a reference pattern when one of the two position sensors 700 fails and the measured torque angle $\delta_{s1}$ is not valid. A middle stage of the sensorless mode shows a reference pattern when one of the two position sensors 700 fails and the measured torque angle $\delta_{s2}$ is not valid. A lower stage of the sensorless mode shows a reference pattern when the two position sensors 700 fail and both the measured torque angles $\delta_{s1}$ and $\delta_{s2}$ are not valid.

As to the six signals comp1 to comp6 of the error group, when the signal comp6 is at a low level while at least one of the remaining signals comp1 to comp5 is at the high level, the fault detection unit 120 selects the sensorless mode. In other words, when the error between the two estimated torque angles $\delta_{s11}$ and $\delta_{s12}$ in one combination is less than the predetermined tolerance value, and when at least one of the error groups in the remaining combinations is equal to or more than the predetermined allowable value, the fault detection unit 120 selects the sensorless mode. At this time, the fault detection unit 120 generates a sel signal indicating, for example, "1", and outputs the sel signal to a selector 130.

On a condition other than the above conditions, the fault detection unit 120 selects the sensor mode, and maintains the sensor control. At this time, the fault detection unit 120 generates the sel signal indicating, for example, "0", and outputs the sel signal to the selector 130.

According to the second embodiment, in the motor control system including at least two position sensors, the abnormality of the sensor control and the sensorless control is detected using the simplified algorithm, and the motor control system is stopped under the predetermined conditions. Consequently, for example, when the motor control system 1000 is applied to a high-performance EPS system, the safety of the EPS system is further improved.

The following description concerns a result of verification using Matlab/Simulink available from MathWorks as to the validity of the algorithm for use in sensor fault detection according to the present disclosure. This verification was made using a model of a surface permanent magnet (SPM) motor. Table 3 shows values of various system parameters in the verification.

TABLE 3

| | |
|---|---|
| Inertia moment | $6.9e^{-5}$ (kg · m$^2$) |
| Frictional coefficient | $5.1e^{-3}$ (Nm/(rad/s)) |
| Resistance (motor + ECU) | 8.50 mΩ + 5.43 mΩ |
| $L_d$ (nominal) | 40.7 μH |
| $L_q$ (nominal) | 38.8 μH |
| Voltage range | 10~16 V |
| Temperature range | −40° C.~90° C. |
| Motor type | DC Brushless motor |
| The number of poles | 8 |
| The number of slots | 12 |
| Maximum current | 77 A |
| Rated voltage | 13.5 V |
| Rated temperature | 80° C. |
| Maximum torque | 5.96 N · m |
| Diameter of wire | φ1.45 mm |
| The number of turns | 11.5 |

Figure 13:
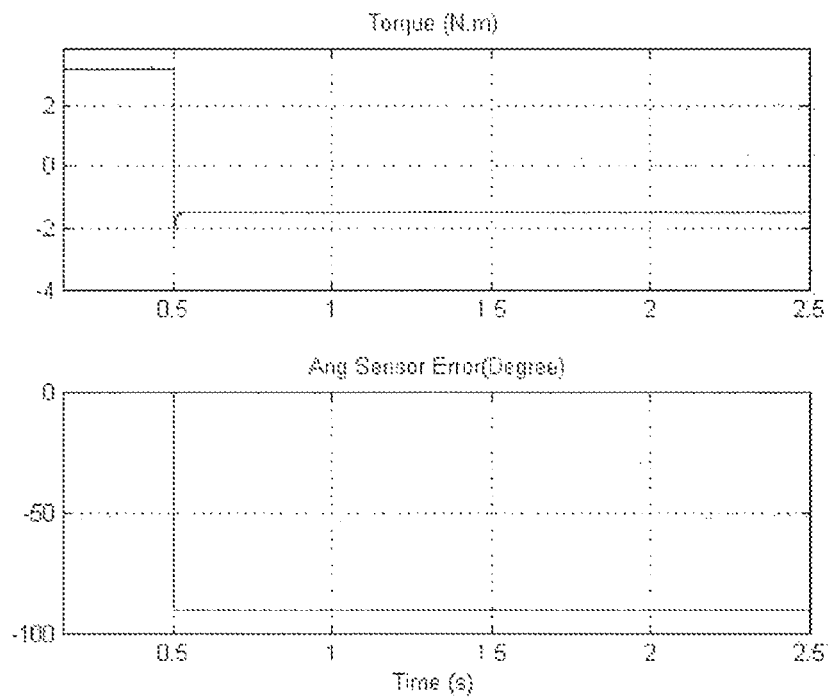
FIG. 13 is a graph of a position sensor error and a torque fluctuation on condition that a position of a magnet sensor is displaced in a case where an MR sensor is used as a position sensor in a conventional motor control system.
Figure 14:
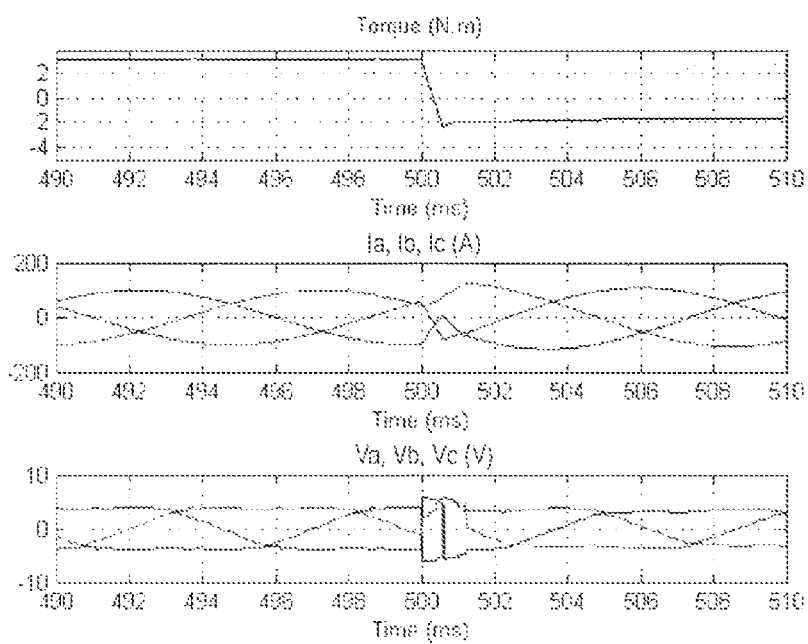
FIG. 14 is a graph of a waveform of a torque, a waveform of a three-phase current, and a waveform of a three-phase voltage within a predetermined period of time.

FIG. 13 is a graph of a position sensor error (angle) and a torque fluctuation on condition that a position of a magnet sensor is displaced in a case where an MR sensor is used as a position sensor in a conventional motor control system. The position sensor error indicates a rotation angle of the magnet sensor. FIG. 14 illustrates a waveforms of a torque, waveforms of three-phase currents ($I_a$, $I_b$, $I_c$), and waveforms of three-phase voltages ($V_a$, $V_b$, $V_c$) within a predetermined period of time (0.49 seconds to 0.51 seconds). In FIG. 13, the horizontal axis indicates a time (s), and the vertical axis indicates the torque (N·m) and the rotation angle of the magnet sensor. In FIG. 14, the horizontal axis indicates the time (ms), and the vertical axis indicates the torque (N·m), the current (A), and the voltage (V).

FIG. 13 illustrates the torque fluctuation on condition that the magnet sensor rotates around the axis of the shaft by −90 degrees (90 degrees clockwise) at a time of 0.5 s. It is apparent from FIG. 13 that the torque fluctuates instantaneously from positive to negative at the time of 0.5 s at which the magnet sensor starts the rotation.

Figure 15:
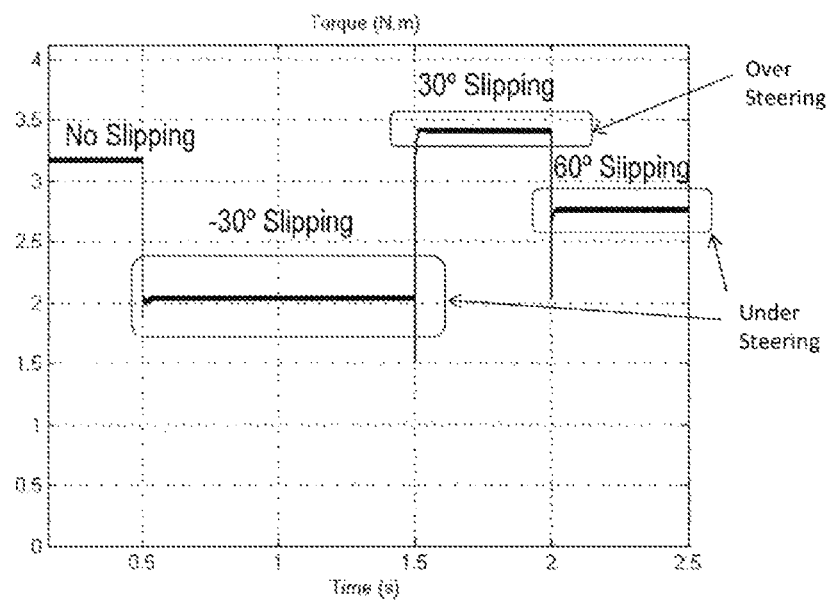
FIG. 15 is a graph of a torque fluctuation when a rotation angle of the magnet sensor fluctuates within the predetermined period of time.

FIG. 15 illustrates the torque fluctuation on condition that the rotation angle of the magnet sensor fluctuates within a predetermined period of time (0 seconds to 2.5 seconds). In FIG. 15, the horizontal axis indicates the time (s), and the vertical axis indicates the torque (N·m). Once the magnet sensor rotates, the rotation angle of the magnet sensor changes from moment to moment. In this example, it is assumed that the magnet sensor rotates by −30 degrees with respect to an initial position at a time of 0.5 s, that the magnet sensor rotates by 30 degrees with respect to the initial position at a time of 1.5 s, and that the magnet sensor rotates by 60 degrees with respect to the initial position at a time of 2.0 s. An amount of torque fluctuation also changes in accordance with the rotation angle of the magnet sensor. In the period of time from the time of 0 s to the time of 0.5 s illustrated in the graph of FIG. 15, the positional displacement of the sensor magnet does not occur. Using the torque in this period of time as a reference, the torque is smaller than the reference (referred to as "under steering") when the sensor magnet rotates by −30 degrees and 60 degrees, and the torque is larger than the reference (referred to as "over steering") when the sensor magnet rotates by 30 degrees.

Figure 16:
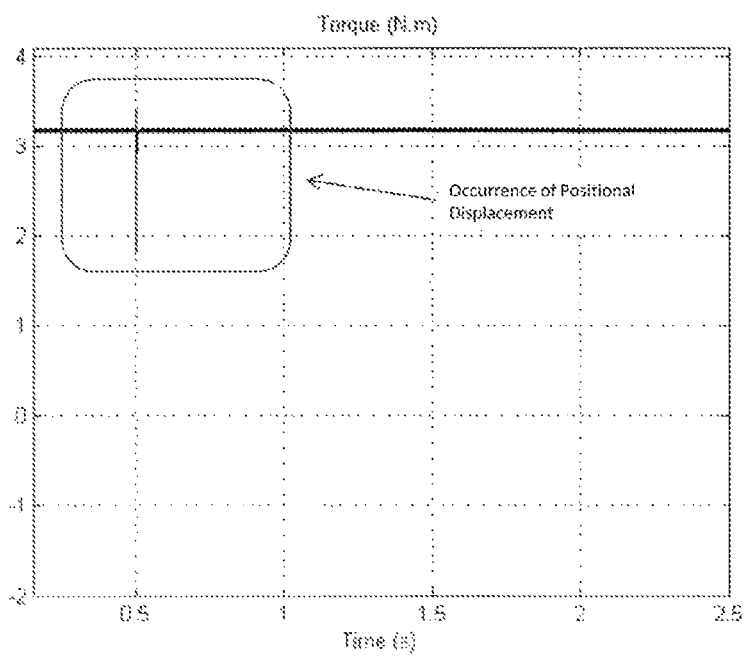
FIG. 16 is a graph of a torque fluctuation on condition that a position of a magnet sensor is displaced in a case where an MR sensor is used as the position sensor in the motor control system according to an exemplary embodiment of the present invention.
Figure 17:
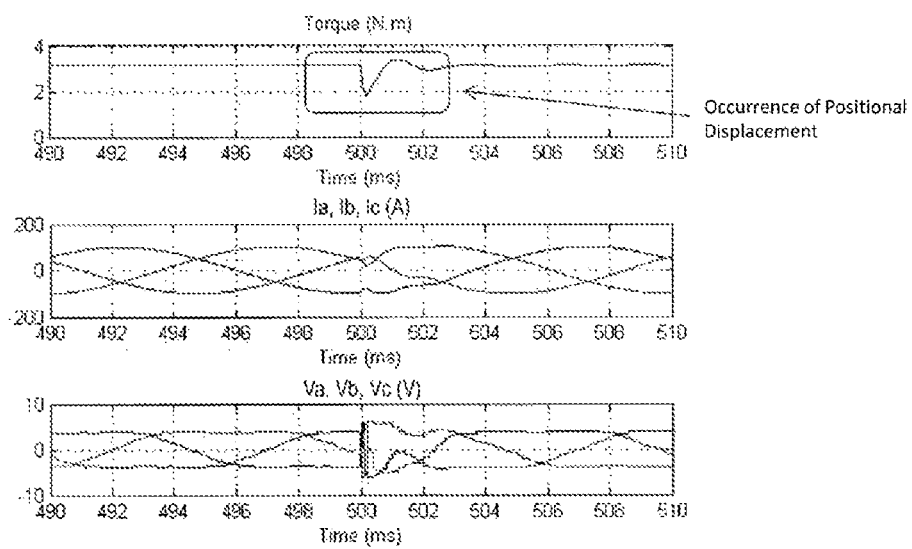
FIG. 17 is a graph of a waveform of a torque, a waveform of a three-phase current, and a waveform of a three-phase voltage within the predetermined period of time.

FIG. 16 is a graph of a torque fluctuation on condition that a position of a magnet sensor 720 is displaced in a case where an MR sensor 710 is used as the position sensor in the motor control system according to the present disclosure. FIG. 17 illustrates a waveform of a torque, waveforms of three-phase currents, and waveforms of three-phase voltages within a predetermined period of time (0.49 seconds to 0.51 seconds). In FIG. 16, the horizontal axis indicates the time (s), and the vertical axis indicates the torque (N·m). In FIG. 17, the horizontal axis indicates the time (ms), and the vertical axis indicates the torque (N·m), the current (A), and the voltage (V).

In this simulation, the magnet sensor 720 rotates 90 degrees at a time of 0.5 s, and the torque fluctuates instantaneously at the time of 0.5 s. However, the torque returns to the torque (target torque) before the positional displacement occurs, in a short period of time. Specifically, the fault detection unit 120 detects the abnormality of the sensor control at the time of 0.5 s, and switches the control mode from the sensor mode to the sensorless mode. This switching allows the EPS system to continuously assist a steering operation of the driver.

Figure 18:
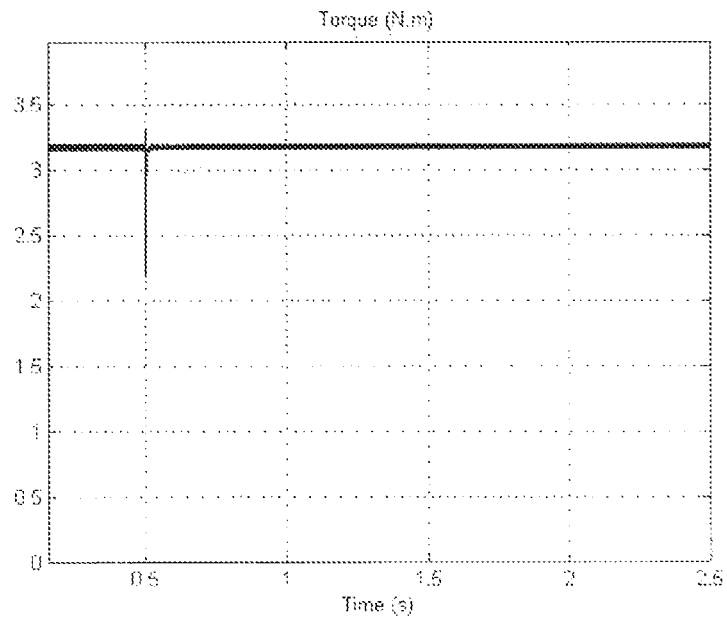
FIG. 18 is a graph of a torque fluctuation on condition that the rotation angle of the magnet sensor fluctuates within the predetermined period of time in a motor control system according to an exemplary embodiment of the present invention.

FIG. 18 illustrates the torque fluctuation when the rotation angle of the magnet sensor 720 fluctuates within a predetermined period of time (0 seconds to 2.5 seconds) in the motor control system 1000 according to the present disclosure. In FIG. 18, the horizontal axis indicates the time (s), and the vertical axis indicates the torque (N·m).

As described above, it is assumed that the magnet sensor 720 rotates by −30 degrees with respect to an initial position at a time of 0.5 s, that the magnet sensor 720 rotates by 30 degrees with respect to the initial position at a time of 1.5 s, and that the magnet sensor 720 rotates by 60 degrees with respect to the initial position at a time of 2.0 s. As illustrated in the graph of FIG. 18, although the torque fluctuates instantaneously at the time of 0.5 s at which the first positional displacement occurs, after that, the torque returns to the target torque even when the rotation angle of the magnet sensor changes. It is apparent from FIG. 18 that under steering and over steering are not caused.

Figure 19:
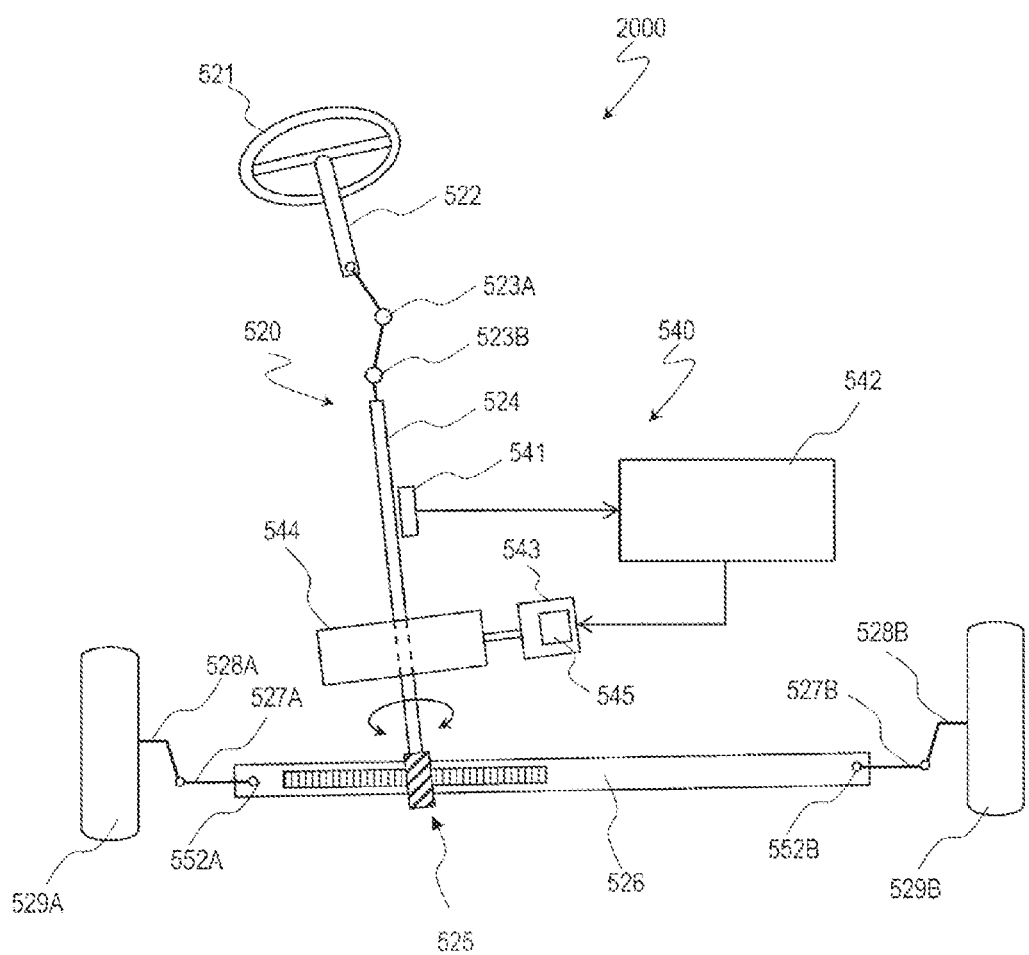
FIG. 19 is a schematic diagram of a typical configuration of an EPS system 2000 according to a third exemplary embodiment of the present invention.

FIG. 19 schematically illustrates a typical configuration of an EPS system 2000 according to a third embodiment.

Typically, a vehicle such as an automobile is equipped with an EPS system. The EPS system 2000 according to the third embodiment includes a steering system 520, and an assist torque mechanism 540 that generates an assist torque. The EPS system 2000 generates an assist torque that assists a steering torque in a steering system, the steering torque being generated when a driver turns a steering wheel. The assist torque reduces a burden of a steering operation on the driver.

For example, the steering system 520 may include a steering wheel 521, a steering shaft 522, universal joints 523A and 523B, a rotating shaft 524, a rack and pinion mechanism 525, a rack shaft 526, left and right ball joints 552A and 552B, tie rods 527A and 527B, knuckles 528A and 528B, and left and right wheels 529A and 529B.

For example, the assist torque mechanism 540 includes a steering torque sensor 541, an automotive electronic control unit (ECU) 542, a motor 543, a speed reduction mechanism 544, and the like. The steering torque sensor 541 detects the steering torque in the steering system 520. The ECU 542 generates a drive signal based on a detection signal from the steering torque sensor 541. The motor 543 generates an assist torque responsive to the steering torque, based on the drive signal. The motor 543 transmits the assist torque to the steering system 520 via the speed reduction mechanism 544.

For example, the ECU 542 includes the controller 100, the drive circuit 200, and the like according to the first embodiment. In the automobile, the ECU serves as a core to constitute an electronic control system. In the EPS system 2000, for example, the ECU 542, the motor 543, and an inverter 545 constitute a motor control system. The motor control system 1000 according to the first embodiment may be suitably used as the motor control system.

An embodiment of the present disclosure is suitably applicable to, for example, a motor control system for a shift-by-wire motor, a steering-by-wire motor, a brake-by-wire motor, a traction motor, and the like each requiring an ability to detect a sensor fault. For example, a motor control system according to an embodiment of the present disclosure is installable in a self-driving car compliant with Levels 0 to 4 (standards of automation) prescribed by the Japanese Government and the National Highway Traffic Safety Administration (NHTSA) of the United States Department of Transportation.

INDUSTRIAL APPLICABILITY

An embodiment of the present disclosure is widely applicable to, for example, a variety of apparatuses equipped with various motors, such as a vacuum cleaner, a dryer, a ceiling fan, a washing machine, a refrigerator, and an electric power steering system.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor control method comprising:
acquiring at least one measured torque angle based on at least one measured rotor angle measured by at least one position sensor and two estimated torque angles based on two sensorless control algorithms;
obtaining all combinations of two torque angles that are combinable with respect to a set of the at least one measured torque angle and the two estimated torque angles and performing an arithmetic operation to determine an error for each combination;
selecting a control mode of the motor from a plurality of control modes including a sensor mode, a sensorless mode, and a shutdown mode;
the selecting step being performed by referring to a table representing a relationship between the plurality of control modes and a plurality of reference patterns relating to the calculated error group; and
controlling the motor in accordance with the selected control mode; wherein
the sensor mode is a mode in which motor control is performed using the at least one measured rotor angle;
the sensorless mode is a mode in which the motor control is performed using at least one of the two estimated rotor angles that are estimated using the two sensorless control algorithms; and
the shutdown mode is a mode in which the motor control is completely shut down.

2. The motor control method according to claim 1, wherein the two sensorless control algorithms are different from each other.

3. The motor control method according to claim 1, wherein in the step of selecting the control mode by referring to the table, the shutdown mode is selected when all the errors in all the combinations are equal to or more than a predetermined value.

4. The motor control method according to claim 1, wherein in the step of selecting the control mode by referring to the table, the sensorless mode is selected when the error between the two estimated torque angles in one combination is less than the predetermined value and when at least one of the error groups in the remaining combinations is equal to or more than the predetermined value.

5. The motor control method according to claim 1, wherein in the selecting the control mode by referring to the table:
the shutdown mode is selected when all the errors in all the combinations are equal to or more than a predetermined value;
the sensorless mode is selected when the error between the two estimated torque angles in one combination is less than the predetermined value and when at least one of the error groups in the remaining combinations is equal to or more than the predetermined value; and
the sensor mode is selected in other conditions.

6. The motor control method according to claim 1, wherein the at least one position sensor includes a magnetoresistive sensor.

7. A motor control system comprising:
a motor;
at least one position sensor that detects a rotor angle of the motor; and
a control circuit that selects a control mode of the motor and controls the motor in accordance with the selected control mode; wherein
the control circuit acquires at least one measured torque angle based on at least one measured rotor angle measured by the at least one position sensor and two estimated torque angles based on two sensorless control algorithms;
the control circuit obtains all combinations of two torque angles that are combinable with respect to a set of the at least one measured torque angle and the two estimated torque angles, and performs an arithmetic operation to determine an error for each combination, each error being obtained between two torque angles in each combination;
the control circuit selects a control mode of the motor from a plurality of control modes including a sensor mode, a sensorless mode, and a shutdown mode, the selection being performed by referring to a table representing a relationship between the plurality of control modes and a plurality of reference patterns relating to the calculated error group;
the control circuit controls the motor in accordance with the selected control mode;
the sensor mode is a mode in which motor control is performed using the at least one measured rotor angle;

the sensorless mode is a mode in which the motor control is performed using at least one of the two estimated rotor angles that are estimated using the two sensorless control algorithms; and the shutdown mode is a mode in which the motor control is completely shut down.

8. An electric power steering system comprising the motor control system according to claim 7.

* * * * *